J. D. BRIGGS.
Corn Sheller.
No. 4,079.
2 Sheets—Sheet 1.
Patented June 14, 1845.
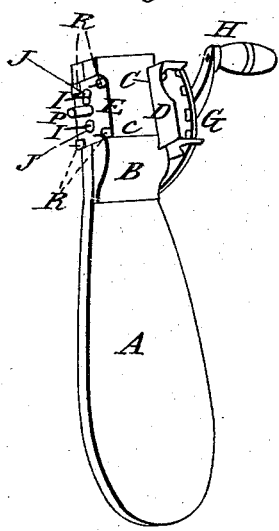

J. D. BRIGGS.
Corn Sheller.
No. 4,079.
2 Sheets—Sheet 2.
Patented June 14, 1845.
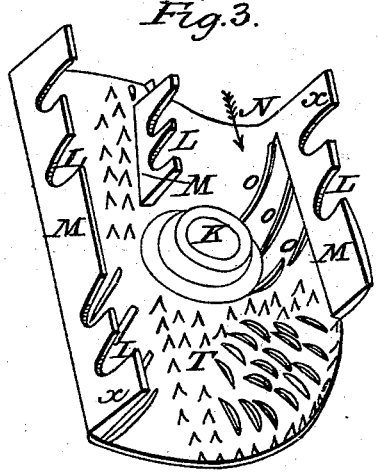
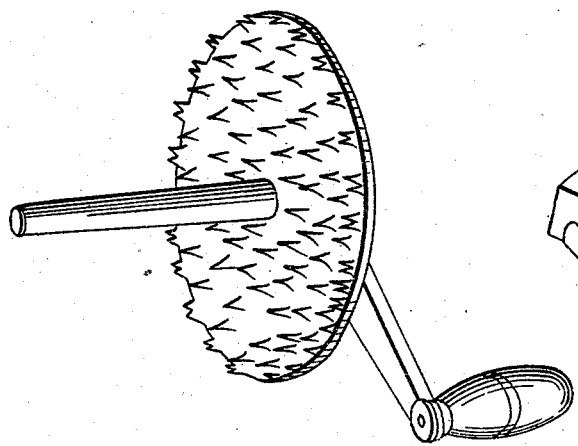
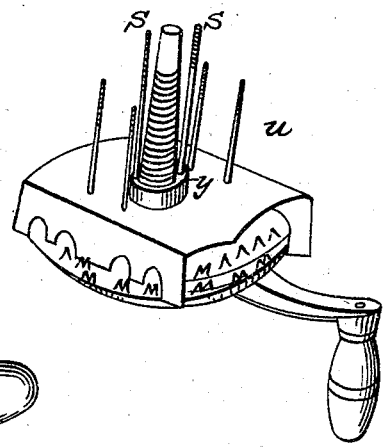

UNITED STATES PATENT OFFICE.

JOSEPH D. BRIGGS, OF SARATOGA SPRINGS, NEW YORK.

CORN-SHELLER.

Specification of Letters Patent No. 4,079, dated June 14, 1845.

*To all whom it may concern:*

Be it known that I, JOSEPH D. BRIGGS, of Saratoga Springs, in the county of Saratoga and State of New York, have invented a new and useful Machine for Shelling Corn; and I do hereby declare that the following is a full, clear, and exact description of the construction and operation of the same, reference being had to the annexed drawing, making a part of this specification, in which—

Figure 1 is a perspective view of the machine entire, and Figs. 2, 3, and 4 represent the construction, and Fig. 5 its operation.

It is a small hand machine made mostly of wood and cast iron. The wood part or frame I will now describe. It is constructed most conveniently of two pieces of plank (A and B Fig. 1). The plank A is about 2 feet and a half long, of convenient width at the point A for a seat (for the operator to sit upon), narrowing toward B. The plank B is nearly one third the length of A, and is laid upon the narrow end of A so as to make that end of the frame 2 or 3 inches thick and 4 or 5 inches wide. About 4 inches from the end a hole is bored to admit the shaft and spring coiled upon it. Upon this part of the frame, with 4 bolts (*c c* Fig. 1) passing above and below the wood or through it, are fastened the iron parts. Except 6 bolts and nuts and a spiral spring they are of cast iron. I name them thus, the rear plate (E Fig. 1) the wheel (G), the stationary plate (D), and the yoke, (on the shaft in the box between E and D not seen Fig. 1). All of these I will now describe separately, and then show the manner of their combination. The bolts are made of ¼ inch iron rod about 5 inches long, headed at one end with screws and nuts at the other. The spring is of brass or iron wire No. 12, 20 coils around the shaft, (U Fig. 4.) The rear plate is an oblong square (E Fig. 1) near 4½ inches by 3, with holes at the corners for the 4 fastening bolts, a hole in center for rear bearing of shaft, and 2 others on each side of this for the 2 bolts attached to the yoke. The wheel, (Fig. 2,) crank spurs and shaft are cast in one piece. Wheel 7 to 8 inches across: shaft 6 to 8 long tapering from ⅜ in. to ⅝ diameter. Crank joined to edge of wheel, length front center 7 inches, with wooden handle. There are spurs, ½ inch long and one inch apart, set in 5 circles around the shaft, those of the outside row or circle being ¼ inch to let the corn in better. The stationary plate (Fig. 3,) is about as long as diameter of wheel with width ¼ less. On its sides are two parallel upright flanks or flanges (M). They are about one inch wide and may be as long as the plate or shorter. (They might be just alike, but I usually make the left one only of full length.) The ends of these (*x x*) project a little by the edge of the wheel when it lies on them. There is a central flange at the top slanting up from left to right to throw out the cob. Through each of these flanges there are slots or notches (depth and width ½ inch) for the regular rows of spurs to pass without touching. The center (K) of this plate, where the shaft passes, is raised conically to place the bearing near the wheel. There are slanting ridges (*o o*) above the center to the right and below to the left to rub and roll the corn. Also teeth and ridges below the center (T,) and some very short blunt ones over which the cob passes going up. All these teeth are raised ¼ inch or less. That the uses of the parts of this stationary plate may be fully understood I will suppose an ear of corn passing through the machine. It enters at the top toward the right (at N) which is hollowed back somewhat, and is borne by the spurs against the flange to the right and downward, tip first, over the ridges (*o o*) slanting to keep it rolling. Having passed below the center (K), the lower end of the cob hangs out (toward P) below, but will not drop out, for the spurs in that place go horizontally, not downward, while the upper end is rolled across the teeth (T) against the flange to the left, whence it is carried up butt first and out at the top. Thus the ear is raked twice full length near the center—down tip first, then up butt first—thus allowing the machine to be made quite small. (W, Fig. 5 is the end of a cob hanging out below as just described.)

The yoke (Y Fig. 4) is merely a small ring for the spring to bear against. It has two ears with bolts in them (S S) with which to pull the yoke against the spring from the outside to vary its bearing. Nothing holds the wheel in but the spring, and this lets it play off for large corn.

The position of the parts may be more fully learned from the method of combining them. They are put together thus. The four fastening bolts being inserted in the stationary plate, the shaft is next put through it, and the flanges lie upon the wheel, while the shaft and 4 bolts stand up through the plate, (Fig. 4). The yoke (y) is now slipped down the shaft upon the plate, and the spring next slipped down the shaft upon the yoke, when its upper end is thrust through the shaft and clenched. Thus the spring turns with the shaft upon the yoke, which, by the 2 bolts (s s) can be pulled against the spring (to make it bear harder) or allowed to recede. These irons (the whole of Fig. 4) are next taken, and the six bolts and the shaft, with spring and yoke upon it, are thrust through the thick end of the frame. The rear plate is now brought against the opposite side of the frame, and shaft and six bolts pass through it also. Nuts are now screwed upon the bolts at the corners, which hold the iron firmly upon the wood. Two other nuts (J, J, Fig. 1,) fit for turning with the fingers are screwed upon the bolts (I I Fig. 1) attached to the yoke, by which the spring's bearing is varied.

(Fig. 5) my cornsheller is used by sitting on it to hold it steady on a bench or chair, or it may be screwed down; turning with the right hand, putting in corn with the left. I use it with or without the yoke. In the latter case the spring bears simply against the stationary plate.

Fig. 5 shows a person shelling from one basket into another.

What I claim as my invention and desire to secure by Letters Patent, is—

The contrivance as above set forth for raking the ear on both sides of the center, first down and then up. The arrangement for this purpose of the flanges M and their combinations with the spurs of the wheel, I claim and wish patented.

JOSEPH D. BRIGGS.

Witnesses:
SHELDON CLARK,
JOHN C. BRIGGS.